April 15, 1969   H. KARSH ET AL   3,438,367
ECTOPIC BEAT DETECTOR
Filed Sept. 27, 1966
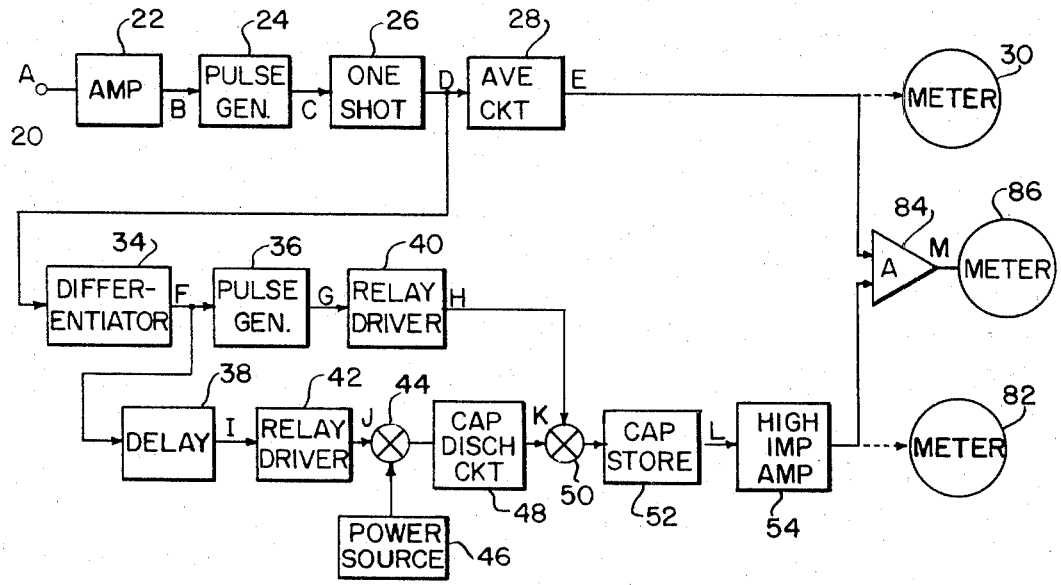
F I G. 1
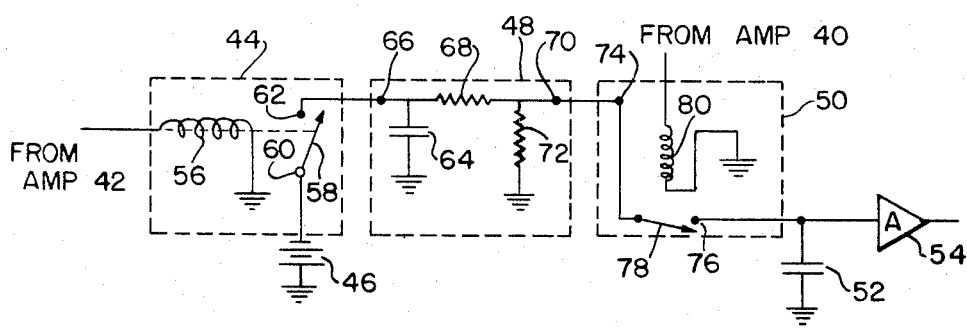
F I G. 3
INVENTORS
HERBERT KARSH
HAROLD S. GOLDBERG
BY
Robert J. Schiller
ATTORNEYS

3,438,367
ECTOPIC BEAT DETECTOR

Herbert Karsh and Harold S. Goldberg, Lexington, Mass., assignors to Lexington Instrument Corporation, Waltham, Mass., a corporation of Massachusetts
Filed Sept. 27, 1966, Ser. No. 582,443
Int. Cl. A61b 5/04

U.S. Cl. 128—2.06                             7 Claims

This invention relates to electro-cardiology and more particularly to novel apparatus for electrically detecting the occurrence of ectopic heart beats.

Ectopic heart beats are frequently symptomatic of serious cardiac difficulties. They are often difficult to detect, particularly in cases where the ectopic beat occurs infrequently. However, by continuous aural monitoring over a period of time during which such beats can be expected to occur, they can be detected but require uninterrupted attention and observation of an attending physician or technician.

The present invention is intended to free individuals from the function of continuous monitoring and provide indication of ectopic beats.

Devices providing automatic, continuous, electrical indication of potentials corresponding to heart functions are common, such as the well known electrocardiographs and a number of cardiotachometers. Prolonged electrocardiography with moving tapes is rarely feasible unless a detailed examination of the electrocardiographic wave form is desired. For the limited purpose of monitoring the heart rate, cardiotachometers are generally used and are generally of two types, either the so-called "beat-by-beat" detector, or the averaging cardiotachometer.

The beat-by-beat detector is generally based upon a system whereby a charge storage device provides voltage levels corresponding respectively to the interval between the two immediately preceding heart beats detected. The level of charge or potential is then sampled at fixed intervals after each beat, and that level displayed.

If the heart beat rate is constant, of course, the sampling will continue to exhibit substantially the same potential and the detector will stay at a fixed level. A change in the heart rate will result in a step change in the indicator level inasmuch as the beat-by-beat detector ignores any measurement more remote than that interval between the two last heart beats. As the usual heart beat rate is rarely precisely constant, the output of this type of detector is usually a series of up and down level changes and it is difficult to distinguish an ectopic beat in the record.

An averaging detector is based upon the principle that the energy output for each heart beat is substantially constant and therefore the device generates a series of pulses corresponding in time to the heart beats, each pulse having a fixed energy constant. The energy of the pulses is averaged in time as by passing them through a leaky RC circuit, thereby providing an output signal in which the average rate is weighted to give the most significance to the most recent measurement of rate, and the least significance to the most remote rate measured, the difference in the significance varying exponentially. Thus, changes in the heart beat rate will be reflected by ramps in the detector output. The response of an averaging detector to an abrupt change in a pulse rate, as from an ectopic beat, is seriously damped by the necessary high time constant of the averaging circuit.

Averaging detectors are typically employed to provide the average heart rate, the latter being indicative of the heart burden required to maintain adequate perfusion. Also the average heart rate taken together with the stroke volume, as detected by a flow meter, provides cardiac output measurement.

Because the beat-by-beat detector yields an "instantaneous" heart rate, it was originally developed for detection of cardiac reactions to emotional stimuli. It has since served additional purposes inasmuch as it clearly displays heart jitter or short term rate irregularities which are clinically significant and is also used to detect fetal heart distress during birth.

It will be apparent that the amplitude of the signal in either the average or the beat-by-beat detector is dependent upon the heart beat rate. Hence, if either measures a heart beat rate of, for example, 60 pulses per minute (p.p.m.) and provides an output signal level of X, then for a 120 p.p.m. rate the signal level will preferably rise to about 2X. It will be apparent that an ectopic beat, interposed between two regular beats, in an otherwise steady pulse train, will cause an output transition in a beat-by-beat detector and be practically ignored in an averaging detector.

A principal object of the present invention is to provide electronic instrumentation particularly adapted for continuous monitoring of heart beat rates so as to detect ectopic beats.

Yet another object of the present invention is to provide a cardiotachometer which, as long as any changes in the pulse rate remains substantially constant in time, continues to provide a constant signal, yet when an abrupt change in pulse rate occurs, gives a positive indication of that change.

Another object of the present invention is to provide apparatus adapted to provide three different clinically significant outputs based upon an input consisting of a train of heart beat derived pulses: the average rate, the "instantaneous" rate and ectopic beat detection.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 is a block diagram showing the elements of a novel circuit for providing all three types of output signals;

FIG. 3 is a detailed schematic circuit diagram of a portion of the embodiment of FIG. 1.

Figure 2:
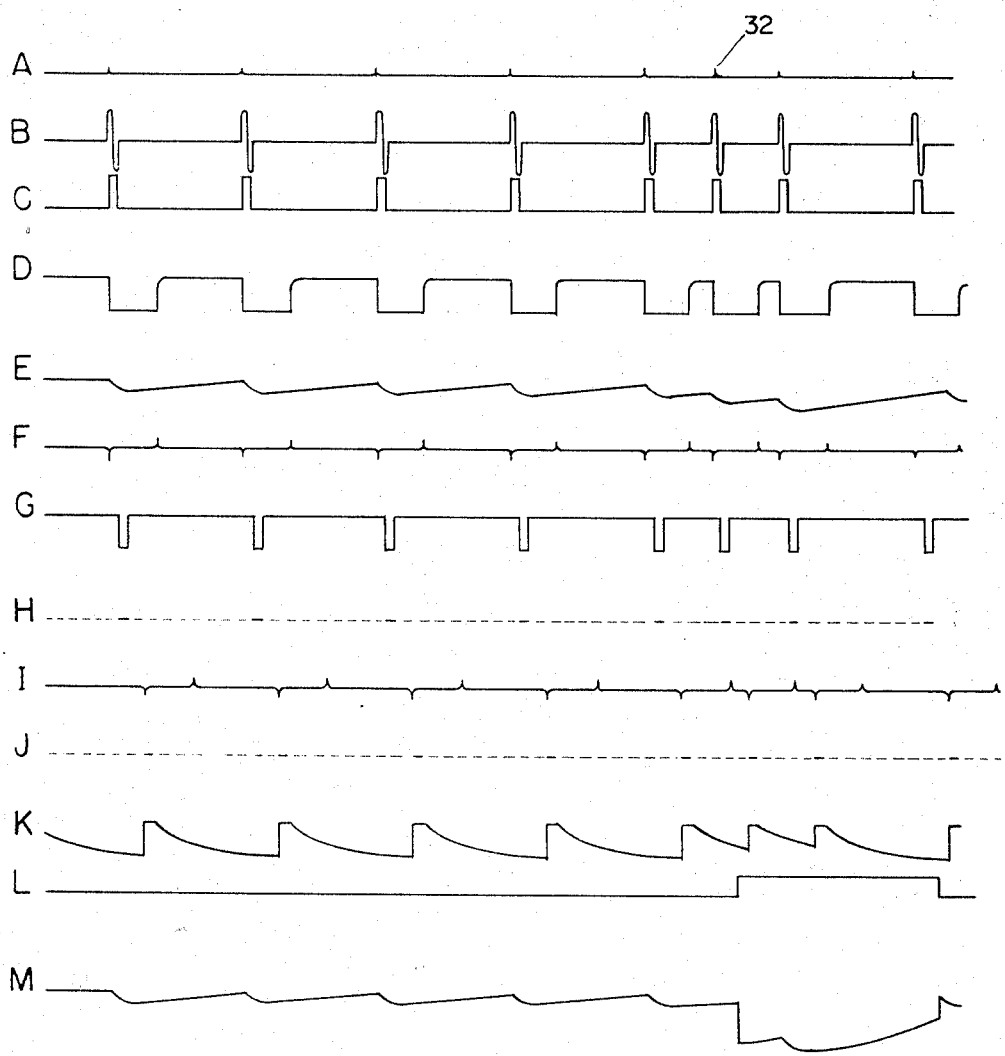
FIG. 2 is a timing diagram showing exemplary, idealized wave-forms occurring at various points in the diagram of FIG. 1.

Referring now to FIG. 1, there is shown an embodiment of the present invention comprising input terminal 20 at which an electrical signal in the form of a pulse train indicative of a heart beat (such as is obtained by electrocardiographic electrode) is intended to be applied. Preferably, input terminal 20 is connected to amplifier 22 for increasing the amplitude of the signals. Amplifier 22 is conveniently a high input impedance amplifier which is also frequency selective so as to filter out interfering high frequency noise.

The output of amplifier 22 is connected to pulse generator 24 which provides, responsively to the input pulses above a given level, a series of uniform, i.e. cleaned-up, pulses each of fixed amplitude and duration, and abrupt rise and fall times. Typically, the pulse generator can be a Schmitt trigger circuit or an overdriven amplifier normally biased off (Class C). The output of generator 24 is connected to the trigger input of monostable multivibrator or one-shot 26, i.e. a two-state device having a stable and a quasi-stable state. The one-shot is intended to provide a train of square-wave pulses each of equal energy content and spaced in time corresponding to the input heart rate pulses at terminal 20. The output of one-shot 26 in turn is connected to averaging circuit 28. The latter typically comprises the usual leaky RC circuit (series resistor with capacitor shunted to ground) having a rather long time constant with respect to the normal heart rate at rest. The output of averaging circuit 28 is connected to a indicating device such as meter 30.

It will be apparent that the device as thus described is simply a typical averaging cardiotachometer. In operation, a pulse train is introduced at terminal 20 such as is shown in FIG. 2 at A. The pulses are idealized forms of the R wave of the usual cardiographic wave form, an ectopic beat being shown at 32 interposed between two regular heart beat pulses. These pulses are passed through amplifier 22, emerging with greater amplitude such as is shown in B of FIG. 2, the pulse time spacing remaining unchanged. Because these pulses are not appropriate for triggering a monostable multivibrator (e.g. the amplitude frequently varies widely from pulse to pulse) it is preferred to further process or shape the pulse train. Hence, the amplifier output is shaped, as in generator 24 emerging as rectangular pulses of substantially constant amplitude and short fixed duration as shown in FIG. 2C. The leading edge of each pulse of FIG. 2C triggers one-shot 26 to induce a rapid transition in the latter from its stable to its quasi-stable state where the device remains for a predetermined time long in comparison with the transition time from state to state. The one-shot finally drops back to its stable state without further triggering. This serves to produce an output which is a substantially rectangular wave of constant amplitude and a duration preferably less than the minimum interval expected between heart beats. For example, if the instrument is designed to measure heart beat rates as high as 250 p.p.m. then the one-shot should produce a square wave of less than 140 milliseconds, preferably about 120 milliseconds. The energy of these square waves is averaged in time by circuit 28 to provide the wave-form shown in FIG. 2E to meter 30. As is seen, FIG. 2E is a slowly (exaggerated in amplitude for purposes of exposition) varying signal level due to the slow time constant of the RC tank of circuit 28 which typically provides a signal decay of 1 to 2% during a pulse interval of, for example, 720 milliseconds (corresponding to about a heart beat rate of 85).

Referring again to FIG. 1, the output of one-shot 26 is also connected to the input of differentiator circuit 34, typically a passive RC circuit or an operational amplifier with a capacitive input impedance and a resistive feedback, in order to duplicate the original pulse train input. The output of circuit 34 is connected both to the input of second pulse generator 36 and the input of delay line 38. The former can be similar to pulse generator 24 whilst the delay line can be any of a number of known devices such as the well known magneto-strictive delay line. The output side of generator 36 is connected to first relay driver amplifier 40, the output of delay line 38 being connected to second relay driver amplifier 42.

First relay controlled switch means 44 is coupled to driver amplifier 42 so as to be operable by the latter for selectively connecting and disconnecting an input connected to DC power source 46 with an output connected to capacitor discharge circuit 48. The output of the latter is connected to an input of a second relay controlled switch means 50. That input of the latter is selectively connected or disconnected to an output coupled to capacitive storage means 52 according as the operation of switch means 50 is controlled by its connection to the output of driver amplifier 40. The output of capacitive storage device 52 is connected to the input of high impedance amplifier 54.

Referring now to FIG. 3 there will be seen an exemplary circuit schematic of a number of elements of FIG. 1 in somewhat more detail. Switch means 44 includes relay coil 56 one side of which is connected to the output from amplifier 42, and the other side of which is grounded. Coil 56 is magnetically couplable to switch armature 58 which is thereby moveable to open or close a circuit between input terminal 60 and output terminal 62. Power source 46 shown as a battery is connected between input terminal 60 of switch means 44 and ground. Capacitive discharge circuit 48 comprises capacitor 64 connected between ground and input terminal 66, the latter being, of course, connected to output terminal 62 of switch means 44. Additionally, the capacitive discharge circuit includes resistor 68 connected in series between input terminal 66 and output terminal 70, and also preferably includes another resistor 72 connected between ground and output terminal 70.

Second switch means 50 includes input terminal 74 and output terminal 76 selectively connectable or disconnectable by moveable switch armature 78, the latter being magnetically coupled so as to be moved by relay coil 80. Coil 80 is connected between the output of amplifier 40 and ground. Capacitor storage device 52 can simply be a capacitor connected between output terminal 76 and ground, output terminal 76 also being connected to the input of high impedance amplifier 54.

The device as thus described starting with circuit 34 will be recognized by those skilled in the art to substantially meet the requirements for a beat-by-beat cardiotachometer and operates in the following manner.

Differentiator 34 essentially reconstitutes the timing of the original pulse train and produces a bipolar output by differentiating the transitions of the output of the one-shot as shown in FIG. 2F. These pulses are applied both to pulse generator 36 and delay line 38. Pulse generator 36, preferably of the type that responds to a unipolar pulse, e.g., a negative-going transition, generates a rectangular pulse train as shown in FIG. 2G, quite similar to the train of FIG. 2C but of opposite polarity for the sake of clarity in exposition. Meanwhile, the pulses from differentiator 34 are delayed by delay line 38 to provide the waveform shown in FIG. 2I, so that the pulses corresponding to the original pulse train of FIG. 2A occur just later than the occurrence of the decay transition of the pulses from generator 36. In other words, each pulse of FIG. 2G is complete just before a corresponding pulse emerges from delay line 38. The pulses are shown in FIG. 2G have been exaggerated in duration for the sake of clarity and of course are preferably much shorter.

Thus, the pulses from the delay line are amplified in ampliler 42 and operate switching means 44 by actuating relay coil 56 to close armature 58 for a series of brief intervals shown as solid lines in the otherwise broken line of FIG. 2J. At each such interval battery 46 provides a potential which is applied to capacitor 64 to change the latter. When armature 58 returns to its normally open portion, the change on capacitor 64 decays with a time constant set by the RC values of circuit 48. Hence, a series of ramps are presented to switching means 50, each starting contemporaneously with an original heart beat pulse as shown in FIG. 2K. However, switching means 50 is operated by the rectangular pulses from amplifier 40 applied to relay coil 80 to close armature 78 from its normally open position for a series of brief intervals shown as solid dashes in FIG. 2J. Each closure of armature 78 therefore samples the potential at terminal 74 for a predetermined interval expiring just prior to recharging of capacitor 64. This sample level is stored in capacitor 52 which is comparatively non-leaky due to the high impedances provided by switch 50 when open and by amplifier 54. Hence, the imput to the latter is a step-function, as show nin FIG. 2L wherein the signal level is quite stable and varies abruptly only when the repetition rate changes, as shown by the presence of ectopic beat 32.

The output of amplifier 54 is connectable to meter 82 which therefore can indicate the "instantaneous" heart beat rate. The output of amplifier 54 is also applied to one input of differential amplifier 84 whilst the output of averaging circuit 28 is applied to the other input of amplifier 84. The latter, well known in the art, is of the type that produces an output signal the amplitude of which is the algebraic difference between the absolute values of the two signals at its respective inputs.

It will be seen that the amplitude of both the signals at the inputs to amplifier 84 will vary substantially with changes in repetition rate of the heart beats, one "instantaneously," the other averaged over a much longer time period. However, the amplitude of the difference signal at the output of amplifier 84, as shown (exaggerated in the amplitude of the ripple) in FIG. 2M and as displayed for example on meter 86 connected to amplifier 84 will not vary substantially in amplitude if the heart beat repetition rate stays constant or if the heart beat repetition rate changes at a substantially constant rate, i.e. the difference signal stays constant for both $dP/dt = 0$ and $dP/dt = K$ where $dP/dt$ is the change in rate of rate of heart beat. Thus, a change in signal amplitude at meter 86 is indicative of $d^2P/dt^2$ or the anomalous beats known as ectopic beats.

Because a small ripple will occur in the output of amplifier 84 as noted in the combined wave form of FIG. 2M, it is preferred that amplifier 84 be of the threshold type, i.e. produces an output signal only when the difference between the amplitude of the two input signals exceeds a predetermined amount greater than the ripple but less than the change produced by the occurrence of an ectopic beat.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. Apparatus for detecting an ectopic beat in a train of heart beat pulses, said apparatus, comprising first means responsive to said train for providing a first signal, the amplitude of which is the average of the repetition rate of said train weighted to give the most significance to the most recent measurement of said rate and the least significance to the most remote measurement of said rate;
    second means responsive to said train for providing a second signal the amplitude of which varies according to measurement of substantially only the interval between the last two pulses in said train; and
    third means for determining the difference in amplitude between said first and second signals so as to provide a third signal indicative of changes in the rate of change of said train caused by one or more ectopic beats.

2. Apparatus as defined in claim 1 wherein said first means comprises:
    means for producing rectangular waves of substantially uniform energy content, each corresponding in time to one of said pulses; and
    means for averaging the energy content of said waves so as to provide said first signal.

3. Apparatus as defined in claim 2 wherein said means for producing said rectangular waves comprises:
    an electrical pulse generator having its input connected to said train for producing a series of shaped pulses corresponding in time to the pulses of said train; and
    a monostable multivibrator triggered by said shaped pulses for providing rectangular waves of duration less than the minimum interval between pulses in said train at the highest expected repetition rate of the latter.

4. Apparatus as defined in claim 1 wherein said second means comprises:
    means for producing a second pulse train delayed with respect to said train of heart beat pulses;
    a leaky capacitive discharge circuit;
    means for charging said discharge circuit periodically according to the repetition rate of said second pulse train; and
    means for sampling the output of said discharge circuit periodically according to the repetition rate of said train of heart beat pulses so as to provide said second signal.

5. Apparatus as defined in claim 4 wherein said means for charging comprises a D.C. power source;
    first normally open switching means operable to close responsively to the pulses of said second pulse train for connecting said power source to said discharge circuit; and
    said means for sampling comprises a capacitive storage device;
    second normally open switching means operable to close responsively to the pulses of said train of heart beat pulses for connecting the output of said discharge circuit to said storage device;
    the pulses of said second train being delayed by an interval sufficient to allow said second switching means to be closed for an interval just preceding the advent of the next corresponding pulse of said train of heart beat pulses.

6. Apparatus as defined in claim 1 including means for indicating the amplitude of said third signal.

7. Apparatus as defined in claim 6 including means for indicating the amplitude of said first signal and means for indicating the amplitude of said second signal.

References Cited

UNITED STATES PATENTS

| | | | |
|---|---|---|---|
| 2,439,495 | 4/1948 | Sturm | 128—2.05 |
| 2,492,617 | 12/1949 | Boland et al. | 128—2.06 |
| 2,848,992 | 8/1958 | Pigeon | 128—2.05 |
| 3,087,488 | 4/1963 | Streimer | 128—2.05 |
| 3,138,151 | 6/1964 | Chapman et al. | 128—2.05 |
| 3,202,149 | 8/1965 | Emmons | 128—2.05 |
| 3,228,391 | 1/1966 | Fitter et al. | 128—2.05 |
| 3,267,934 | 8/1966 | Thornton | 128—2.06 |
| 3,352,300 | 11/1967 | Rose | 128—2.06 |

WILLIAM E. KAMM, *Primary Examiner.*